May 28, 1940.    G. A. GILLEN    2,202,051
ELECTRICAL MACHINE
Filed Sept. 18, 1937    2 Sheets-Sheet 1
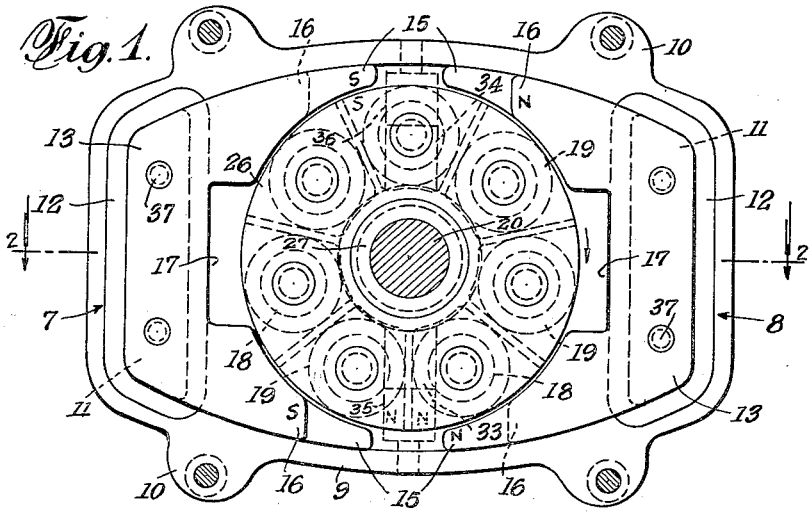
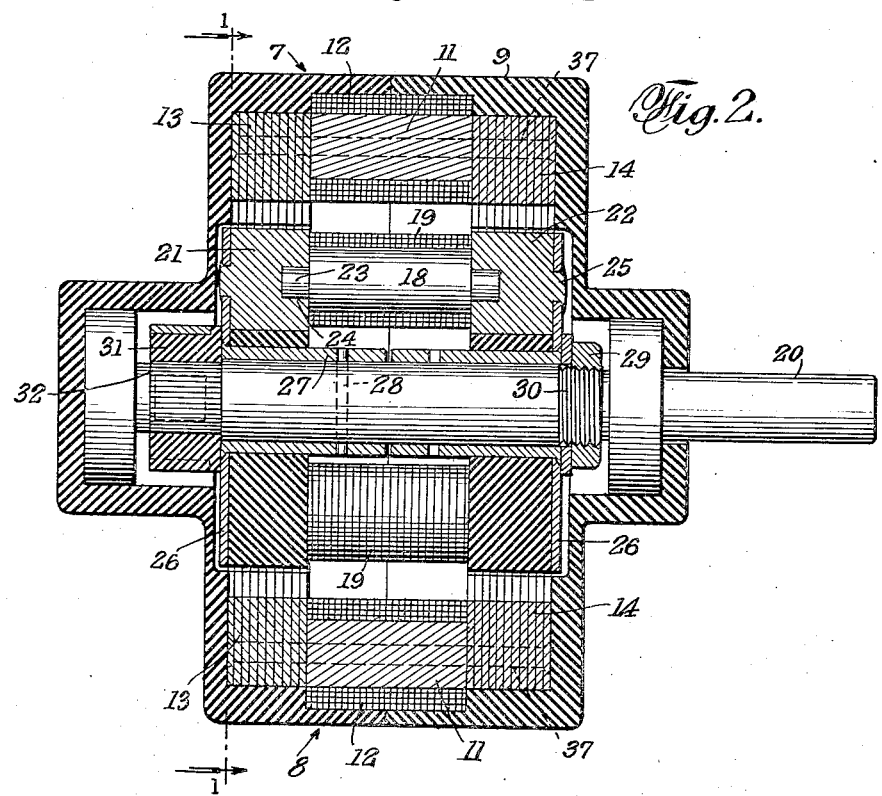
GEORGE A. GILLEN
INVENTOR
BY
ATTORNEY

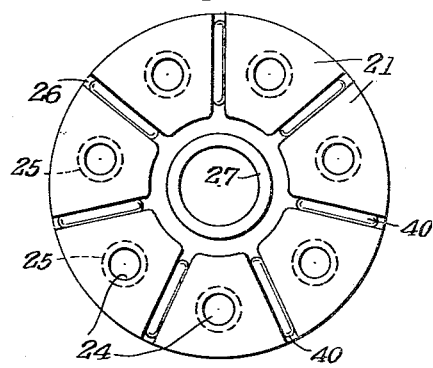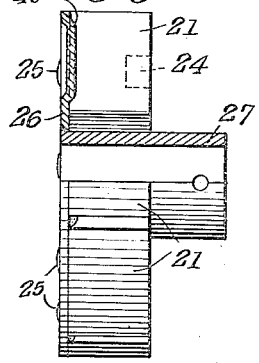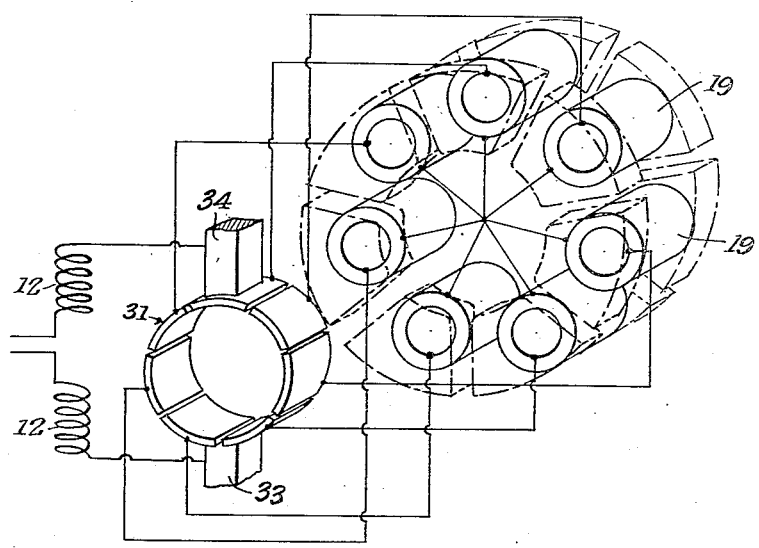

Patented May 28, 1940

2,202,051

UNITED STATES PATENT OFFICE 2,202,051

ELECTRICAL MACHINE

George A. Gillen, Bronx, N. Y.

Application September 18, 1937, Serial No. 164,428

7 Claims. (Cl. 172—36)

The invention here disclosed relates to electrical machines in the nature of motors and generators.

Objects of the invention are to provide a machine of the type mentioned of simple sturdy construction, which can be manufactured at low cost and which will have desirable torque and power characteristics.

Other objects of the invention and the novel features of construction, combinations and relations of parts by which the objects are attained are set forth and will appear in the following specification and claims.

The drawings accompanying and forming part of the specification illustrate one practical embodiment of the invention, but it is contemplated that the structure may be modified and changed as regards this particular disclosure, all within the true intent and broad scope of the invention.

Fig. 1 in the drawings is an end view of the machine with parts appearing in section as with the end of the casing and the commutator cut away as on substantially the plane of line 1—1 of Fig. 2.

Fig. 2 is a horizontal sectional view of the motor shown in Fig. 1, as on line 2—2 in that view.

Fig. 3 is an end view of one of the end members of the armature.

Fig. 4 is a side view of the same, partly in section.

Fig. 5 is a wiring diagram.

The machine shown is of the general type covered in the co-pending Gillen patent applications Ser. Nos. 112,625 and 148,539, filed Nov. 25, 1936, and June 16, 1937, the former having matured into Patent No. 2,139,012, December 6, 1938, involving cooperating field and armature structures having U-type magnets with inwardly and outwardly facing opposed poles and a single commutator for effecting a combination of magnetic attraction and repulsive effects at each field pole.

In Figs. 1 and 2, the field is shown as made up of two magnets 7, 8, supported and secured in diametrically opposite relation within a two part case 9, secured together at 10.

Each field magnet is shown as composed of an intermediate core portion 11, receiving the energizing winding 12, and over the opposite ends of which are secured the pole pieces 13, 14.

As shown particularly in Fig. 1, each pole piece or shoe is formed with one long horn 15, and one shorter horn 16, and with an intermediate cutaway portion 17, between such relatively long and short horns.

The armature is shown as made up of a circular series of electromagnets consisting in each instance of a core 18, receiving the winding 19, and disposed parallel with the armature shaft 20, and having applied to the ends of the same segmental pole pieces 21, 22. These armature pole pieces are shown as having concentric convex outer faces directly opposed to and in line with correspondingly concave faces of the field poles.

The field poles are shown arranged in staggered relation with the long horn 15, of one field magnet opposed to and directly opposite a short horn 16, of the other field magnet. The long horns are shown as of slightly greater length than the arcuate magnet lobes of the armature and the shorter horns as of somewhat less extent than the arcuate length of these lobes. The intermediate or cutout spaces 17 are indicated as approximately equal in extent to the arcuate lobes of the armature.

For assembly purposes, the cores 18 of the armature magnets are shown as having reduced end extensions 23, to enter corresponding seats 24, in the lobes 21, 22, and the latter are indicated as having projections 25, extended through and riveted over nonmagnetic end plates 26, carried by or forming parts of sleeves 27. These sleeves are suitably fixed on the armature shaft, for example, as shown in Fig. 2, by pinning one sleeve on the shaft at 28, and by setting up the other sleeve toward the first by a clamp nut 29, engaged on a screw-threaded portion 30 of the shaft.

The commutator 31, is indicated as fixed on the shaft at the outer side of the pinned sleeve by being forced over a fluted or knurled portion 32, on the shaft. Spring pressed brushes are indicated at 33, 34, slidingly operating in guide passages 35, 36, provided in the casing.

The magnets may be laminated or solid as conditions of use may dictate. Usually and particularly for operation on alternating current service or for operation as a universal motor, the field magnets will be of laminated structure as indicated with the polar laminations secured over the ends of the cores by suitable through fastenings such as indicated at 37. The cores 11 may be either solid or laminated and may be secured as by staking portions of the same through the polar laminations, after the coils 12, have been slipped thereover or wound thereabout.

The armature coils may be wound about the cores 18 and then after the first mounting sleeve 27 is pinned on the shaft at 28, be engaged at 23, 24, with the companion pole segments, after which the second mounting sleeve may be slipped over the shaft into engagement over the free ends of the cores. The nut 29 can then be applied and turned up to exert sufficient end pressure to force the cores and pole pieces into firm magnetically continuously interlocked engagement.

With the construction described, the weight of the magnets is located about the rim of the armature to provide a maximum flywheel effect. The alternately disposed long and short horns of the field poles provide desirable starting and torque characteristics. The cutting out of the intermediate portions of the field poles enables each pole to operate on two spaced armature lobes with the lobe intermediate the two active lobes, idle or inactive. This result is incated in Fig. 1 and by the wiring diagram, Fig. 5, where it will be seen that the commutation is such that one field pole will be attracting an armature lobe at one horn, while repulsing the second removed armature lobe at the other horn and that this double attraction and repulsion is present at each of the four field magnet poles. In detail the circuit can be traced in Fig. 5 from one side of the source through one field coil 12, to one brush, say the upper brush 34 and from the segment on which that brush rests to the uppermost rotor coil and from that to the common star connections between the opposite ends of the rotor coils and thence from the two lowermost rotor coils to the two lowermost commutator segments over which the lower brush 33, bridges at the moment and from that brush to the other field coil 12, to the opposite side of the line. In this particular position, the parts will be magnetized as indicated in Fig. 1, that is, with the near end of the left hand field magnet polarized S and the near end of the right hand field magnet oppositely polarized or N. At the same instant, the upper rotor magnet will be polarized at the near end with an S pole opposed to the S field pole at the left and opposed to the N field pole at the right to create repulsion at the left and attraction at the right, so to effect right hand or clockwise rotation of the armature. At this same time, the energization of the lower left hand rotor coil produces an N pole which is attracted by the S field pole at the left and the lower right hand rotor coil creates an N pole repulsed by the right hand N field pole, all of which forces result in clockwise torque on the rotor, substantially equal and opposite effects, in the same direction of rotation at the same time being created at the opposite end of the rotor, as will be obvious.

The horns of the field poles are of generally tapering shape as shown in Fig. 1, so that the casing can be of a flattened elliptical form to occupy small space. The two part casing may be molded in Bakelite or other plastic, or if desired, may be die cast in non-magnetic metal.

The armature magnets may be surrounded by or embedded in molded insulating medium or in non-magnetic die cast material.

Motors and generators embodying the invention may be produced at relatively low cost, particularly because of the simplicity of design and the ease of assemblage of the parts.

To firmly lock the lobes in position on the supporting flanges 26, the latter may be ribbed radially as indicated at 40, to engage opposite sides of the segments.

What is claimed is:

1. An electric machine of the character disclosed, comprising cooperating field and armature structures, said field structure consisting of two U-type field magnets in opposed relation with pole pieces, each having relatively long and short horns separated by an intermediate gap and arranged with the longer and shorter horns in succession in respect to rotation of the armature and said armature including U-type magnets having arcuate segmental polar lobes of substantially the extent of said intermediate gaps and commutating means for energizing the armature magnets with lobes opposed to said separated horns.

2. An electric machine of the character disclosed, comprising cooperating field and armature structures, said field structure consisting of two U-type field magnets in opposed relation with pole pieces, each having relatively long and short horns separated by an intermediate gap and arranged with the longer and shorter horns in succession in respect to rotation of the armature and said armature including U-type magnets having arcuate segmental polar lobes of substantially the extent of said intermediate gaps, commutating means for energizing the armature magnets with lobes opposed to said separated horns and said relatively long and short horns being disposed in diagonal opposition at the opposite ends of the machine.

3. An electric machine of the character disclosed, comprising cooperating field and armature structures, said field structure consisting of two U-type field magnets in opposed relation with pole pieces each having relatively long and short horns separated by an intermediate gap and arranged with the longer and shorter horns in succession in respect to rotation of the armature and said armature including U-type magnets having arcuate segmental polar lobes of substantially the extent of said intermediate gaps, commutating means for energizing the armature magnets with lobes opposed to said separated horns, end members consisting of annular supporting flanges and said magnet lobes being secured on the inner faces of said annular supporting flanges.

4. An electric machine of the character disclosed, comprising cooperating field and armature structures, said field structure consisting of two U-type field magnets in opposed relation with pole pieces, each having relatively long and short horns separated by an intermediate gap and arranged with the longer and shorter horns in succession in respect to rotation of the armature and said armature including U-type magnets having arcuate segmental polar lobes of substantially the extent of said intermediate gaps, commutating means for energizing the armature magnets with lobes opposed to said separated horns, end members consisting of annular supporting flanges and said magnet lobes being secured on the inner faces of said annular supporting flanges and means for forcing said end flanges toward each other on the armature shaft, to thereby firmly hold said magnet cores and windings in position between said lobes.

5. An electric machine of the character disclosed, comprising cooperating field and armature structures, said field structure consisting of two U-type field magnets in opposed relation with pole pieces, each having relatively long and short horns separated by an intermediate gap and arranged with the longer and shorter horns in succession in respect to rotation of the armature and said armature including U-type magnets having arcuate segmental polar lobes of substantially the extent of said intermediate gaps, commutating means for energizing the armature magnets with lobes opposed to said separated horns, end members consisting of annular supporting flanges and said magnet lobes being secured on the inner faces of said annular supporting flanges, means for forcing said end flanges toward each other on the armature shaft, to thereby firmly hold said magnet cores and windings in position between said lobes and said cores and lobes having interfitting parts.

6. An electric machine, comprising field magnets having cores and polar extensions at opposite ends of the same, windings on said cores, said polar extensions each having relatively short and long horns separated by an intermediate gap and said magnets being mounted in opposition with a short horn of one magnet opposite a long horn of the other magnet and an armature rotatably mounted between said polar extensions and having segmental polar lobes opposed to said horns of the field magnets.

7. In an electric machine, supporting flanges having radial positioning elements, segmental polar lobes secured against the face of said supporting flanges and held in definite position by said radial positioning elements, magnet cores between said lobes and windings about said cores.

GEORGE A. GILLEN.